United States Patent
Myers et al.

(10) Patent No.: US 8,253,810 B2
(45) Date of Patent: Aug. 28, 2012

(54) METHOD, APPARATUS AND SYSTEM FOR IMAGE STABILIZATION USING A SINGLE PIXEL ARRAY

(75) Inventors: Charles Myers, Corvallis, OR (US); Michael J. Brosnan, Fremont, CA (US); Charles Moore, Loveland, CO (US); Richard A. Baumgartner, Palo Alto, CA (US); Christopher Silsby, Albany, OR (US); Brian J. Misek, Fort Collins, CO (US)

(73) Assignee: Aptina Imaging Corporation, George Town (KY)

( * ) Notice: Subject to any disclaimer, the term of this patent is extended or adjusted under 35 U.S.C. 154(b) by 1026 days.

(21) Appl. No.: 11/987,869

(22) Filed: Dec. 5, 2007

(65) Prior Publication Data
US 2009/0147091 A1 Jun. 11, 2009

(51) Int. Cl.
H04N 5/228 (2006.01)
H04N 3/14 (2006.01)
H04N 5/335 (2006.01)
G03B 17/00 (2006.01)

(52) U.S. Cl. ........... 348/208.1; 348/208.99; 348/208.5; 348/294; 348/296; 348/302; 396/52; 396/54; 396/55

(58) Field of Classification Search .......... None
See application file for complete search history.

(56) References Cited

U.S. PATENT DOCUMENTS

| | | | |
|---|---|---|---|
| 6,522,357 B2 * | 2/2003 | Beiley et al. | 348/296 |
| 6,784,928 B1 * | 8/2004 | Sakurai et al. | 348/220.1 |
| 6,963,060 B2 * | 11/2005 | Knee et al. | 250/208.1 |
| 7,064,362 B2 * | 6/2006 | Roy | 257/225 |
| 7,105,793 B2 | 9/2006 | Rhodes | |
| 7,312,431 B2 * | 12/2007 | Rhodes | 250/208.1 |
| 7,598,979 B2 * | 10/2009 | Trutna et al. | 348/208.4 |
| 7,855,731 B2 * | 12/2010 | Yu | 348/208.6 |
| 7,884,868 B2 * | 2/2011 | Kurane | 348/297 |
| 8,072,520 B2 * | 12/2011 | Rysinski | 348/296 |
| 2002/0003581 A1 | 1/2002 | Sato et al. | 348/333.11 |
| 2004/0258152 A1 * | 12/2004 | Herz | 375/240.16 |
| 2005/0110884 A1 * | 5/2005 | Altice et al. | 348/302 |
| 2006/0028554 A1 * | 2/2006 | Usui | 348/208.99 |
| 2006/0044243 A1 * | 3/2006 | Rysinski | 345/92 |
| 2007/0115364 A1 * | 5/2007 | Kumaki | 348/208.99 |
| 2007/0132852 A1 * | 6/2007 | Yu | 348/207.99 |

(Continued)

OTHER PUBLICATIONS

"200 Million Mice Click with Agilent Optical Mouse Sensors," [online] Nov. 26, 2003, [retrieved on Apr. 19, 2007], retrieved from www.embeddedstar.com/press/content/2003/11/embedded11677.html.

(Continued)

Primary Examiner — Jason Chan
Assistant Examiner — Michael Osinski
(74) Attorney, Agent, or Firm — David C. Kellogg; Louis R. Levenson

(57) ABSTRACT

An imaging pixel array and associated method and system are disclosed in which the array contains first pixels each having a first photo-conversion device, and second pixels each having a first photo-conversion device and a second photo-conversion device. The first photo-conversion devices are configured to acquire an image during a first integration period. The second photo-conversion devices are configured to acquire a plurality of images during the first integration period. A circuit uses the plurality of image signals and determines from them relative motion between the array and an image during a portion of the first integration period and provides a signal representing the motion which is used for image stabilization.

25 Claims, 14 Drawing Sheets

U.S. PATENT DOCUMENTS

| | | | |
|---|---|---|---|
| 2008/0143841 A1* | 6/2008 | Tico et al. | 348/208.99 |
| 2008/0170128 A1* | 7/2008 | Oh et al. | 348/208.11 |
| 2009/0021588 A1* | 1/2009 | Border et al. | 348/208.1 |
| 2009/0141155 A1* | 6/2009 | Ellis-Monaghan et al. | 348/308 |

OTHER PUBLICATIONS

"Optical Mice and how they Work: The Topical Mouse is a complete imaging system in a tiny package," Agilent Technologies, Nov. 5, 2001.

"Richardson-Lucy deconvolution" [online] [retrieved on Apr. 19, 2007], [retrieved from www.answers.com/topic/richardson-lucy-devonvolution].

"Richardson-Lucy deconvolution," [online] [retrieved on Apr. 19, 2007] [ retrieved from http://en.wikipedia.org/wiki/Richardson-Lucy_deconvolution].

Fish, D.A., et al, "Blind deconvolution by means of the Richardson-Lucy algorithm," [online], 2007, [retrieved on Apr. 19, 2007], [retrieved from www.opticsinfobase.org/abstract.cfm?URI=josaa-12-1-58].

He, H., et al., "An EM Based Resolution Enhancement Algorithm Considering Partially Known Point Spread Function", Proc. IEEE Western New York Image Processing Workshop, Rochester, NY, Sep. 2004.

\* cited by examiner

METHOD, APPARATUS AND SYSTEM FOR IMAGE STABILIZATION USING A SINGLE PIXEL ARRAY

FIELD OF THE INVENTION

Embodiments of the invention relate to the field of imaging devices, particularly to imaging devices employing image stabilization.

BACKGROUND OF THE INVENTION

Image blur is a common problem in both digital and traditional photography. While there are a variety of causes of image blur, one of the most common causes is camera shake inadvertently introduced by the operator of the camera. Image blur resulting from camera shake becomes more pronounced as cameras or other imaging devices become smaller and lighter, with longer exposure times, or when the operator uses a zoom or telephoto lens with a long focal length. Hand-held imaging devices, such as cameras or associated lenses, may include an image stabilization system to reduce image blur.

Generally, image stabilization systems detect motion of the imaging device and attempt to reduce blur by counteracting or compensating for the detected motion. Motion of the imaging device may be detected by the inclusion of a pair of micro-electro-mechanical (MEM) gyroscopes within the imaging device. Typically each MEM gyroscope detects motion in a plane. In digital photography, motion of the imaging device may be electronically detected by determining any movement of otherwise "still" objects within the field of view of successive frames captured by the imaging device.

In digital photography, once the motion is determined, compensation can be performed, for example, by moving a flexible platform to which a pixel array is mounted to compensate for the detected motion. Alternatively, elements of a lens structure may be moved relative to the array to compensate for the detected motion.

FIG. 1 is an illustration of a conventional four transistor (4T) pixel 100 typically used in a CMOS imager for example, in a digital camera. Pixel 100 functions by receiving photons of light reflected from a desired image and converting those photons into electrons. Pixel 100 includes a photosensor 105, shown as a photodiode, a floating diffusion charge storage region (floating diffusion region) 110, and four transistors: a transfer transistor 115, a reset transistor 120, a source follower transistor 125, and a row select transistor 130. The pixel 100 accepts a TX control signal for controlling the conductivity of the transfer transistor 115, a RST control signal for controlling the conductivity of the reset transistor 120, and a ROW control signal for controlling the conductivity of the row select transistor 130. The charge stored at the floating diffusion region 110 controls the conductivity of the source follower transistor 125. The output of the source follow transistor 125 is presented at node 135, which is connected to a column line of a pixel array, when the row select transistor 130 is conducting.

The pixel 100 is operated as follows. The ROW control signal is asserted to cause the row select transistor 130 to conduct. At the same time, the RST control signal is asserted while the TX control signal is not asserted. This connects the floating diffusion region 110 to the pixel power potential VAAPIX at node 140, and resets the voltage at this floating diffusion region 110 to the pixel power potential VAAPIX, less a voltage drop associated with reset transistor 120. The pixel 100 outputs a reset signal (Vrst) at node 135. As will be explained in greater detail below in connection with FIG. 2, node 135 is typically coupled to a column line 235 (FIG. 2) of an imager 200, which supplies a constant current through the source follower transistor 125.

While the transfer transistor 115 is off, the photosensor 105 is exposed to incident light focused by a lens or a lens system and accumulates charge based on the level of the incident light during what is often referred to as a charge integration period. After the charge integration period and after the RST control signal turns off reset transistor 120, the TX control signal is asserted. This transfers charge from the photosensor's charge accumulation region to the floating diffusion region 110 by connecting the floating diffusion region 110 to the photosensor 105. Charge flows through the transfer transistor 115 and lowers the voltage at the floating diffusion region 110 proportional to the accumulated charge and the capacitance of the floating diffusion node. The pixel 100 thus outputs a photo signal (Vsig) at node 135 which is connected to a column line of a pixel array.

The states of the transfer and reset transistors 115, 120 determine whether the floating diffusion region 110 is connected to the light sensitive element 105 for receiving photo-generated charge accumulated by the light sensitive element 105 after the charge integration period, or a source of pixel power $V_{AAPIX}$ from node 140 during the reset period. In use, the floating diffusion region 110 is typically blocked from sensing light or, if floating diffusion region 110 is not blocked from sensing light, any light generated charge collected by the floating diffusion region 110 is lost through the reset process.

FIG. 2 is an illustration of an imager 200 that includes a plurality of pixels 100 forming a pixel array 205. Typically, each pixel has a micro lens and a color filter in the light path to the pixel and the color pixels are arranged in a known Bayer R,G,B, pattern. Due to space limitations, the pixel array 205 is drawn as a 4 row by 4 column array in FIG. 2. One skilled in the art would recognize that most imagers 200 would ordinarily include hundreds, thousands, or millions of pixels 100 in the pixel array. The imager 200 also includes row circuitry 210, column circuitry 215, a digital processing circuit 220, and a storage device 225. The imager 200 also includes a controller 230, for controlling operations of the imager 200.

The row circuitry 210 operates a row of pixels 100 from the pixel array 205. The pixels 100 in the selected row output their reset and photo signals Vrst, Vsig to the column circuitry 215, via column output lines 235, which samples and holds the reset and photo signals Vrst, Vsig for each pixel in a row. The rows are activated one by one in sequence to send successive reset and photo signals from pixels of a selected row to the column output lines 235.

In prior art devices, the column circuitry 215 is responsible for converting the pixel reset Vrst and photo Vsig signals into digital values that can then be further processed in the digital domain. In order to do this, the column circuitry 215 samples and holds the reset Vrst and photo Vsig signals produced by each pixel. An analog pixel output signal (Vpixel) is formed as the difference between the reset Vrst and photo Vsig signals, e.g., Vpixel=Vrst−Vsig. Alternatively, the analog pixel output signal may be received from an analog readout to side analog to digital conversion. The pixel output signal Vpixel is then converted into a digital value representing the luminance of a pixel. Imager 200 uses a column parallel architecture, in which the outputs of several pixels 100 in the selected row are simultaneously sampled and held, and converted to digital values. The digital values are sent to the digital processing circuit 220, which performs image processing on the digital values to produce a digital image. The processed digital values are stored in the storage device 225. The controller 230 is coupled to the pixel array 205, row circuitry 210, column circuitry 215, and storage device 225, and provides control signals to perform the above described processing. The imager 200 is typically employed in a digital camera where image stabilization is a desirable feature. Past efforts to provide image stabilization in such a system have not been entirely satisfactory.

DETAILED DESCRIPTION

Figure 1:
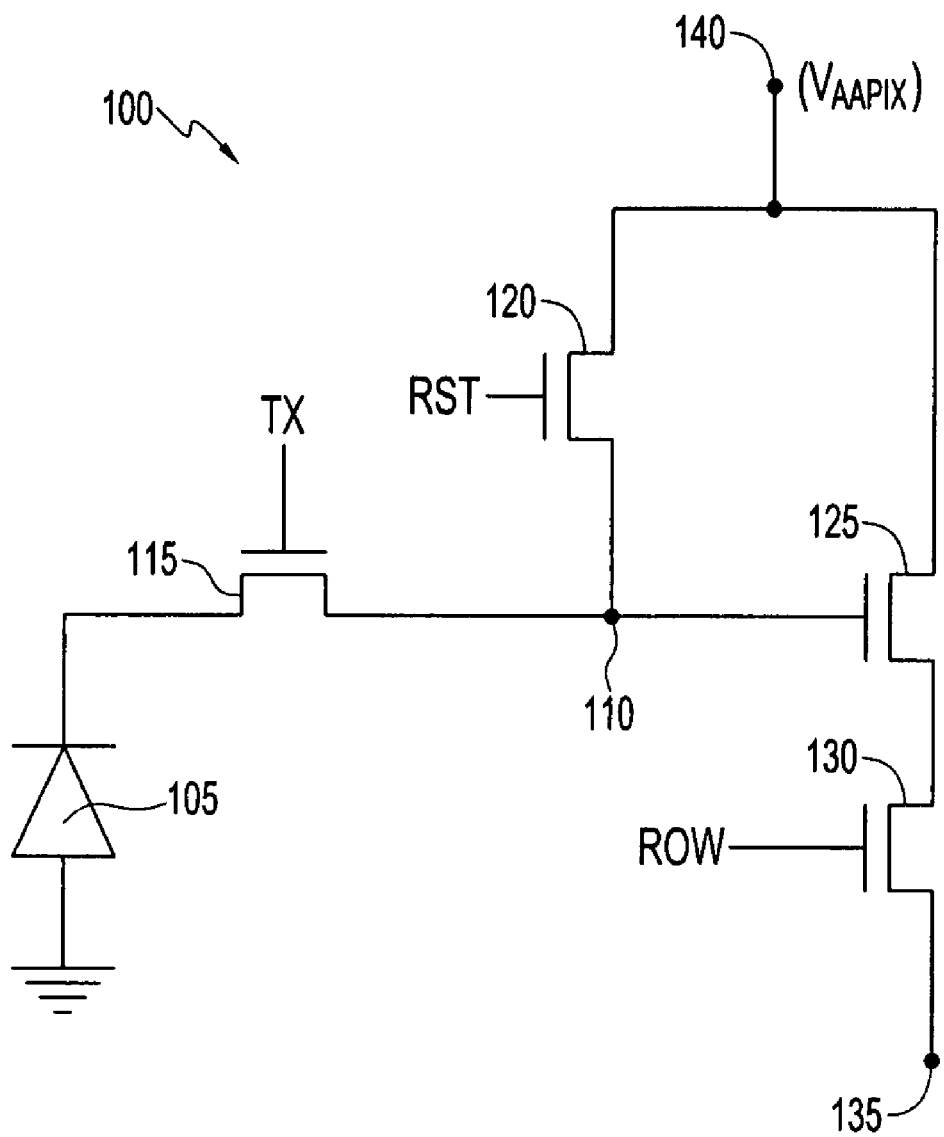
FIG. 1 illustrates a conventional imager pixel.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice them, and it is to be understood that other embodiments may be utilized, and that structural, logical and electrical changes may be made.

The term "pixel" refers to a picture element unit cell containing a photosensor device and other devices for converting electromagnetic radiation to an electrical signal. For purposes of illustration, a representative CMOS pixel and pixel array are illustrated in the figures and description herein, and typically fabrication of all pixels in a pixel array of an image device will proceed simultaneously in a similar fashion. It should be understood that embodiments also encompass other solid state imagers and associated pixels, such as CCD and others.

One suggested method of image stabilization includes the use of a separate optical array, sometimes called a navigational array, for motion detection. The detected motion can then be compensated for through various methods such as repositioning of the primary array (the array used to capture the desired image), repositioning the optics, e.g., elements of a lens assembly or similar approaches. The navigational array is composed of pixels separate from those included in the primary array which are used to detect movement of the imaging device.

For example, co-pending patent application Ser. No. 11/232,319, which is hereby incorporated in its entirety by reference, is entitled "Imaging Device With Blur Reduction System" and is owned by the assignee of the present application, discloses the addition of at least one navigational array, a correlator and a compensator within an imaging device. The at least one navigational array is configured to acquire a series of images during the integration period including first and second images having common features from the selected scenes. The correlator is configured to receive the series of images from the at least one navigational array and determine the location differences of common features between the first and second images relative to the at least one navigation array. The correlator also provides a displacement signal indicative of imaging device translation in two planar dimensions during an interval between the first and second images based on the location differences of the common features. The compensator is configured to opto-mechanically maintain a substantially fixed relationship between the selected scene and the primary and at least one navigation pixel arrays based on the displacement signals. The navigational array, correlator and the compensator form a blur reduction system.

The disadvantages of image stabilization systems employing a navigational array include the cost, size and footprint of the separate lens and pixel array needed for the navigational array. Similarly, disadvantages of other image stabilization systems include the cost, size, expense and weight of gyros and mechanical actuators, and the cost of the computational hardware and memory required to store the additional images. The embodiments disclosed herein seek to mitigate some of these disadvantages.

U.S. Pat. No. 7,105,793, which is hereby incorporated in its entirety by reference, is entitled "CMOS Pixels For ALC and CDS and Methods of Forming the Same" and is owned by the assignee of the present application describes and discloses pixels that allow both automatic light control and correlated double sampling operations. The pixels described therein include first and second photo-conversion devices that can be separately read out. One embodiment described in the '793 patent has second photo-conversion device located in the pixel's floating diffusion region, with an area and doping profile suitable for photo-conversion.

Figure 3A:
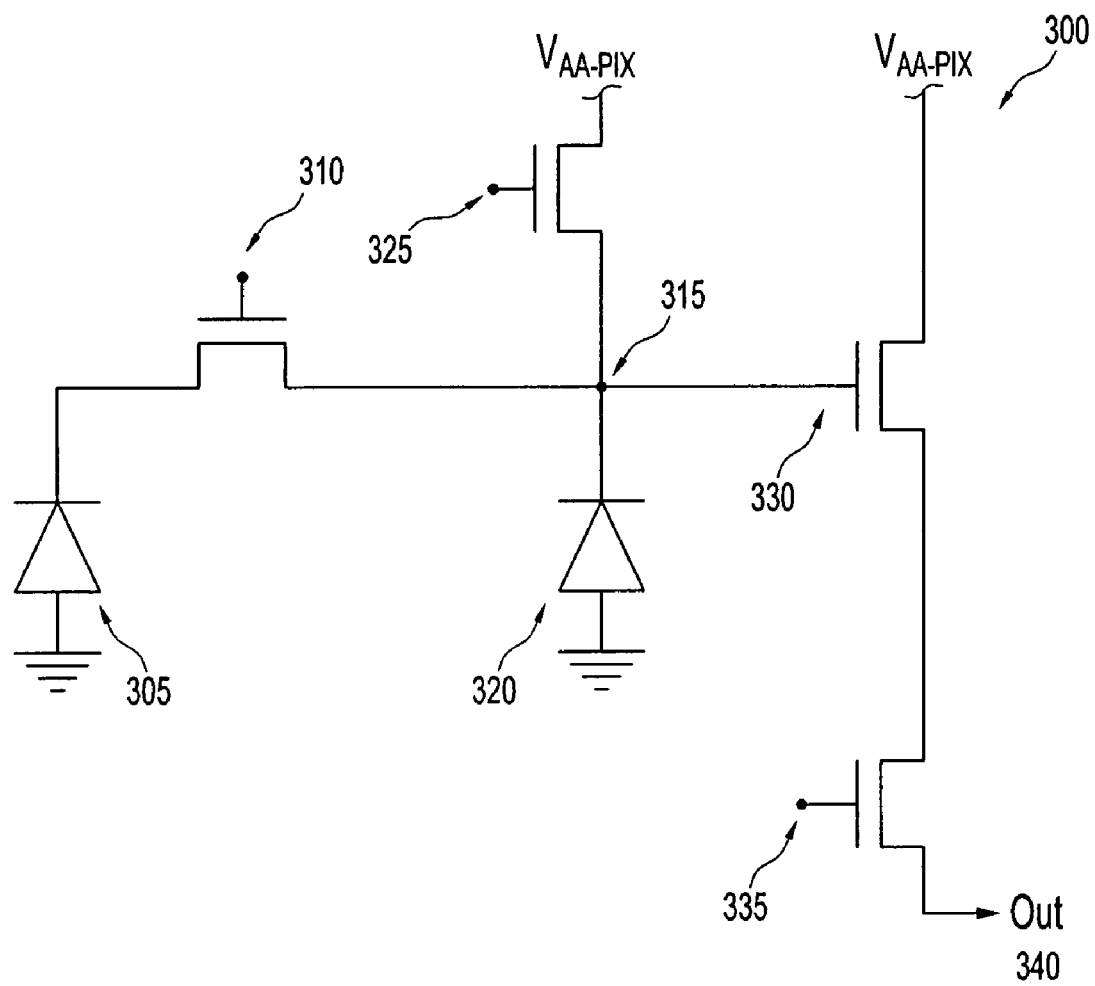
FIG. 3A is a schematic diagram of a pixel used in an embodiment described herein.
Figure 3B:
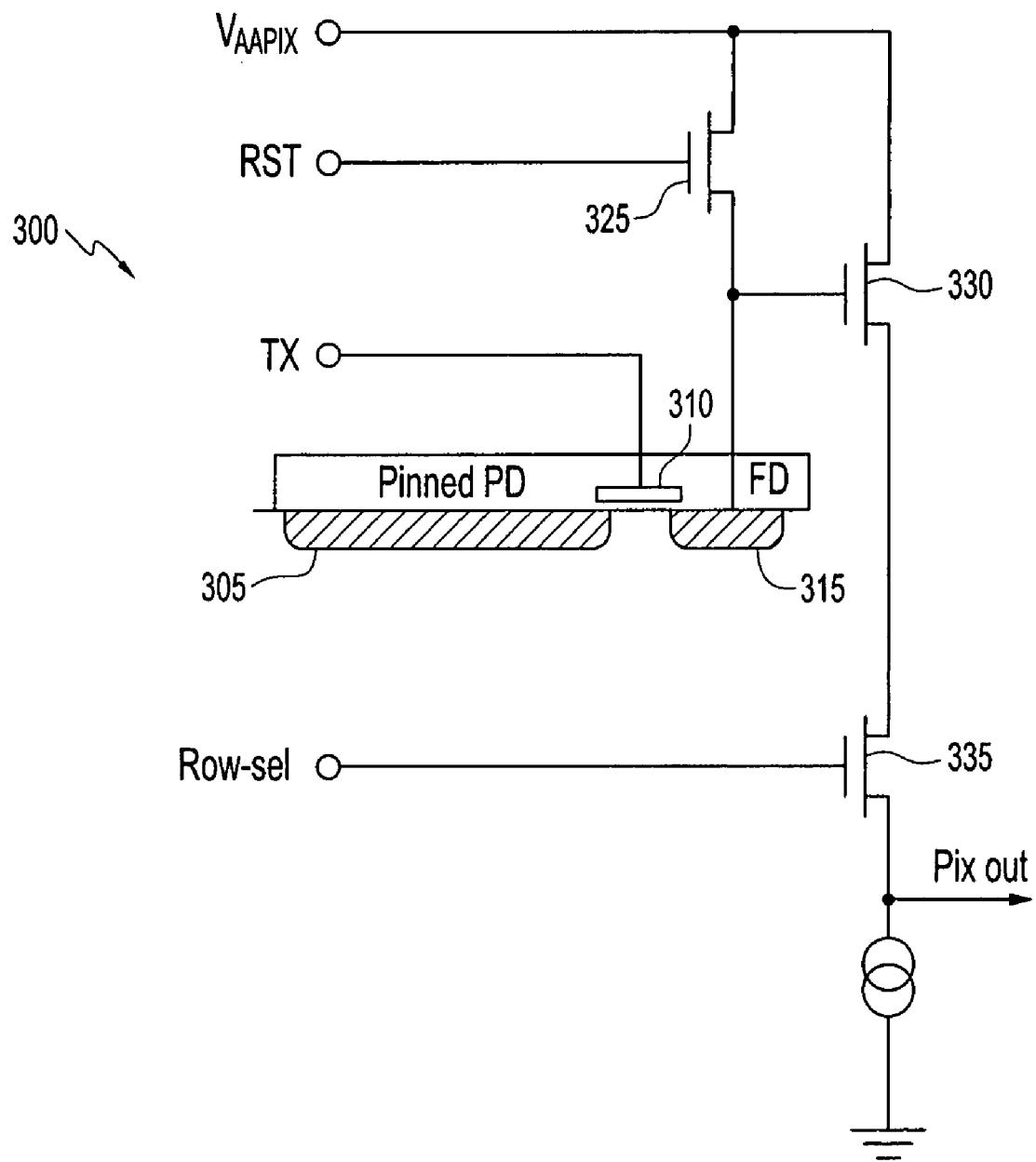
FIG. 3B is a second schematic diagram of the pixel of FIG. 3A.

FIGS. 3A and 3B are schematic diagrams of a pixel 300 which may be used to acquire images for image stabilization in an embodiment described herein. Pixel 300 includes a first photo-conversion device, shown as a pinned photodiode 305, for generating charge in response to external light incident on the pixel 300. Connected to the pinned photodiode 305 is transfer transistor 310 for transferring photo-generated charge to a floating diffusion charge storage region (floating diffusion region) 315 at the completion of the integration period and at the time for readout of the photo-generated charge. Floating diffusion region 315 is configured as a second photo-conversion device 320 and includes a charge storage area sufficiently large enough to allow storage of generated charge in response to external light incident on pixel 300. In a typical four transistor pixel, as shown in FIG. 1, the floating diffusion region is shielded from incidental light to prevent charge collection at the floating diffusion region 315, but in embodiments of the invention the floating diffusion region is not shielded and is instead used as a light detector. As floating diffusion region 315 generates charge, that charge may be read out without interference from the charge being generated and stored in the first photo-conversion device such as the pinned photodiode 305 during the integration period of the first photo-conversion device. This is because during charge integration of photodiode 305 transfer transistor 310 is not activated. In addition, the pixel 300 includes a reset transistor 325, a source follower transistor 330, and a row select transistor 335.

The pixel 300 accepts a TX control signal for controlling the conductivity of the transfer transistor 310, a RST control signal for controlling the conductivity of the reset transistor 325, and a ROW control signal for controlling the conductivity of the row select transistor 335. The charge stored at the floating diffusion region 315 determines its voltage and the source follower transistor 330 passes that voltage, with an added offset, to its output. The output of the source follower transistor 330 is presented at node 340, which is connected to a column line of a pixel array, when the row select transistor 335 is conducting.

As described, floating diffusion region 315 is also a photodiode photo-collection device and collects charges when exposed to light. Differences in charges sequentially collected by floating diffusion region 315 are used to detect motion of the imaging device. Thus, in disclosed embodiments, pixel 300 may accumulate charge through at least two different photosensor elements, pinned photodiode (PD) 305 and floating diffusion region (FD) 315. While the illustrated embodiment is disclosed and described using a 4T pixel, the embodiment is also applicable to other pixel configurations, which include a floating diffusion region or some other charge storage node with a connection to a silicon diffusion region.

Figure 2:
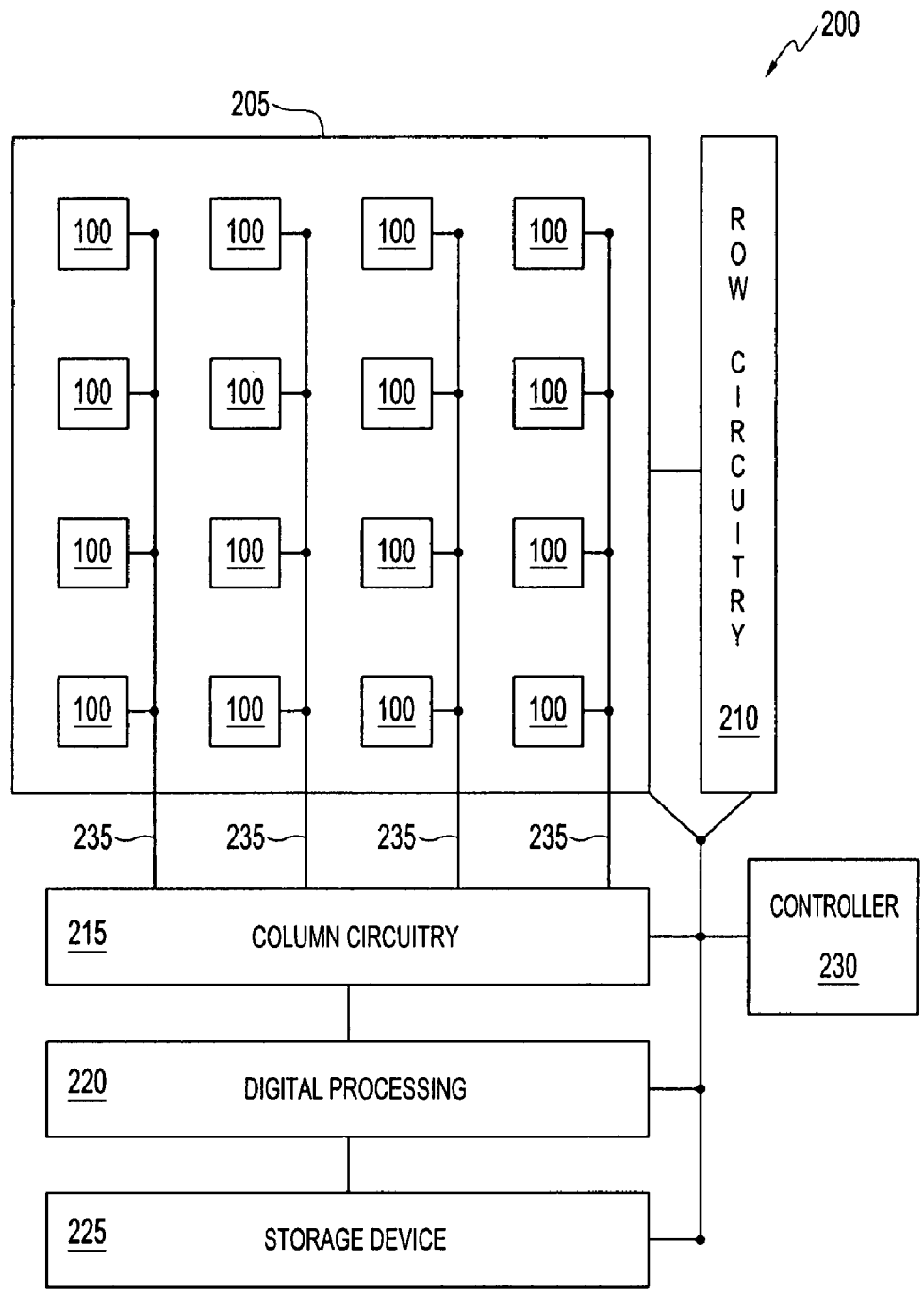
FIG. 2 illustrates an imager utilizing the imager pixel of FIG. 1.
Figure 4:
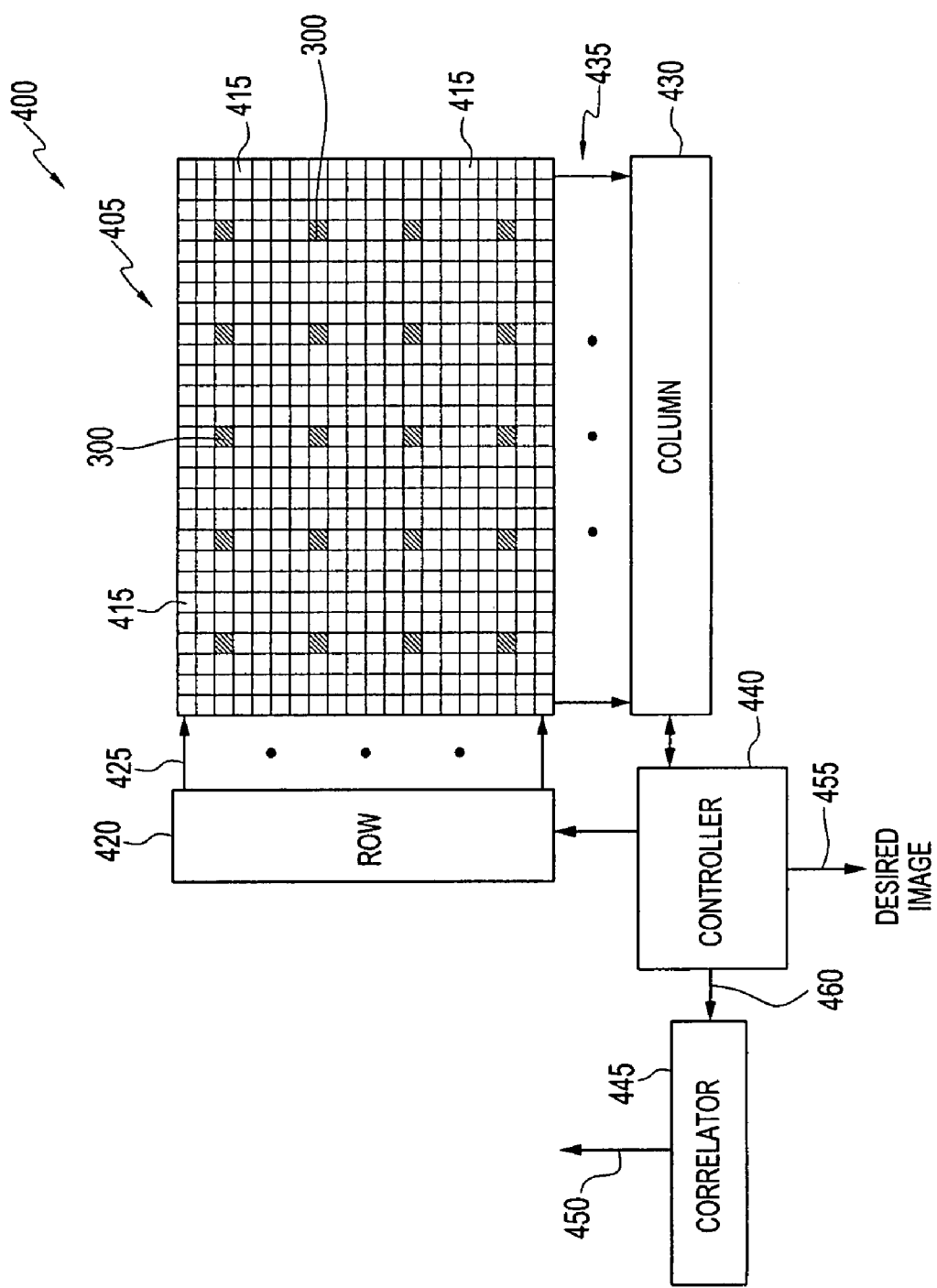
FIG. 4 is a block and schematic diagram illustrating a single array image stabilization system of an embodiment described herein.

FIG. 4 is a simplified block and schematic diagram from that illustrated in FIG. 2 which illustrates a single array image stabilization system 400 in which certain pixels of pixel array 405 are constructed as shown in FIGS. 3A and 3B and thus include first and second photo-conversion devices which are used both to detect motion of the imaging device and in image capture. Pixels including first and second photo-conversion devices are referred to herein as dual-mode pixels. Pixel 300 of FIGS. 3A and 3B is a representative dual-mode pixel. Pixel array 405 is composed of dual-mode pixels 300 and single mode pixels 415, having a single pinned diode 105 as a photo detector, e.g., as shown in FIG. 1. FIG. 4 is similar to FIG. 2 where a number of single mode pixels have been replaced with dual mode pixels, a correlator 445 has been added and the timing has been altered to accommodate the inclusion of the dual mode pixels. In some embodiments it is desirable to increase the concentration of dual mode pixels close together for good movement visibility and resolution. In still other embodiments each pixel or pixel array 405 is composed of dual-mode pixels. As depicted in FIG. 4, dual mode pixels 300 may be selected to form a grid-like pattern which is evenly distributed throughout pixel array 405. Preferably, dual-mode pixels would be located around the middle of the field of view of the main camera as imaged on the pixel array to maximize the common features available for comparison. By locating the dual-mode pixels 300 around the middle of the field of view, potential problems resulting from nearly featureless objects, such as a blue sky or a driveway in the outskirts of the image would be reduced. Dual-mode pixels may also be located within the pixel array in patterns, such as, for example, vertical lines, horizontal lines, and intersecting vertical and horizontal lines. Alternatively, dual-mode pixels may be located at non-regularly spaced intervals in the pixel array. Other arrangements and locations of the dual mode pixels may also be used and the entire pixel array could also be composed of dual mode pixels, though to reduce processing time of images used for image stabilization this is less preferred. The inclusion of both single-mode pixels and dual-mode pixels in a single pixel array may undesirably create fixed-pattern artifacts in the image caused by the different behavior of the pixel types.

Each row of pixels in FIG. 4 is connected to a row select circuit 420 via row select lines 425 and each column of pixels of pixel array 405 is connected to column readout circuit 430 via column output lines 435. As further described below, a controller 440 controls the readout of charges accumulated in the first photo-conversion devices 305 of the dual-mode pixels 300 and the one photo-conversion devices of single mode pixels 415 of pixel array 405. Readout of the charge accumulated in the first photo-conversion devices 305 of each pixel of pixel array 405 occurs at the end of the integration period in the standard manner and the controller causes a desired image 455 to be captured. The sole photo-conversion device of each single mode pixel 415 is included as a first photo-conversion devices 305.

Preferably, the same controller 440 controls the readout of the charges accumulated in the first photo-conversion devices of all the pixels of pixel array 405 and second photo-conversion devices of the dual-mode pixels 300 of pixel array 405. The controller 440 performs these readouts by selecting and activating appropriate row signal lines 425 via row select circuit 420 and causing column readout circuit 430 to input signals from the column output lines 435. Charge accumulated on the second photo-conversion devices of the dual-mode pixels 300 are read out at a higher rate by controller 440 than the charges accumulated on the first photo-conversion devices of the dual-mode pixels 300 and the single mode pixels 415. In one example embodiment, controller 440 is configured to cause the read out of the charge accumulated on the second photo-conversion devices, of the dual-mode pixels 300 ten times during the integration period of the first photo-conversion devices of the dual-mode pixels 300 and the single mode pixels 415. By reading out the charges on the second photo-conversion devices in this manner, a series of low-resolution images may be provided by controller 440 during the integration period of the first photo-conversion devices of all pixels in pixel array 405. Controller 440 provides this series of low-resolution images to correlator 445 via signal path 460. In an exemplary embodiment, correlator 445 identifies common features between first and second images generated from the charges on the second photo-conversion devices and determines differences in the location of these common features between images. Using the location differences of the common features, correlator 445 provides a displacement signal 450 indicative of translation of the imaging device during the time interval between the first and second images. In embodiments in which the pixel array 405 is composed exclusively of dual-mode pixels controller 440 controls the readout of the charges accumulated in both the first photo-conversion devices of the dual-mode pixels as well as the second photo-conversion devices of the dual-mode pixels 300.

Figure 5:
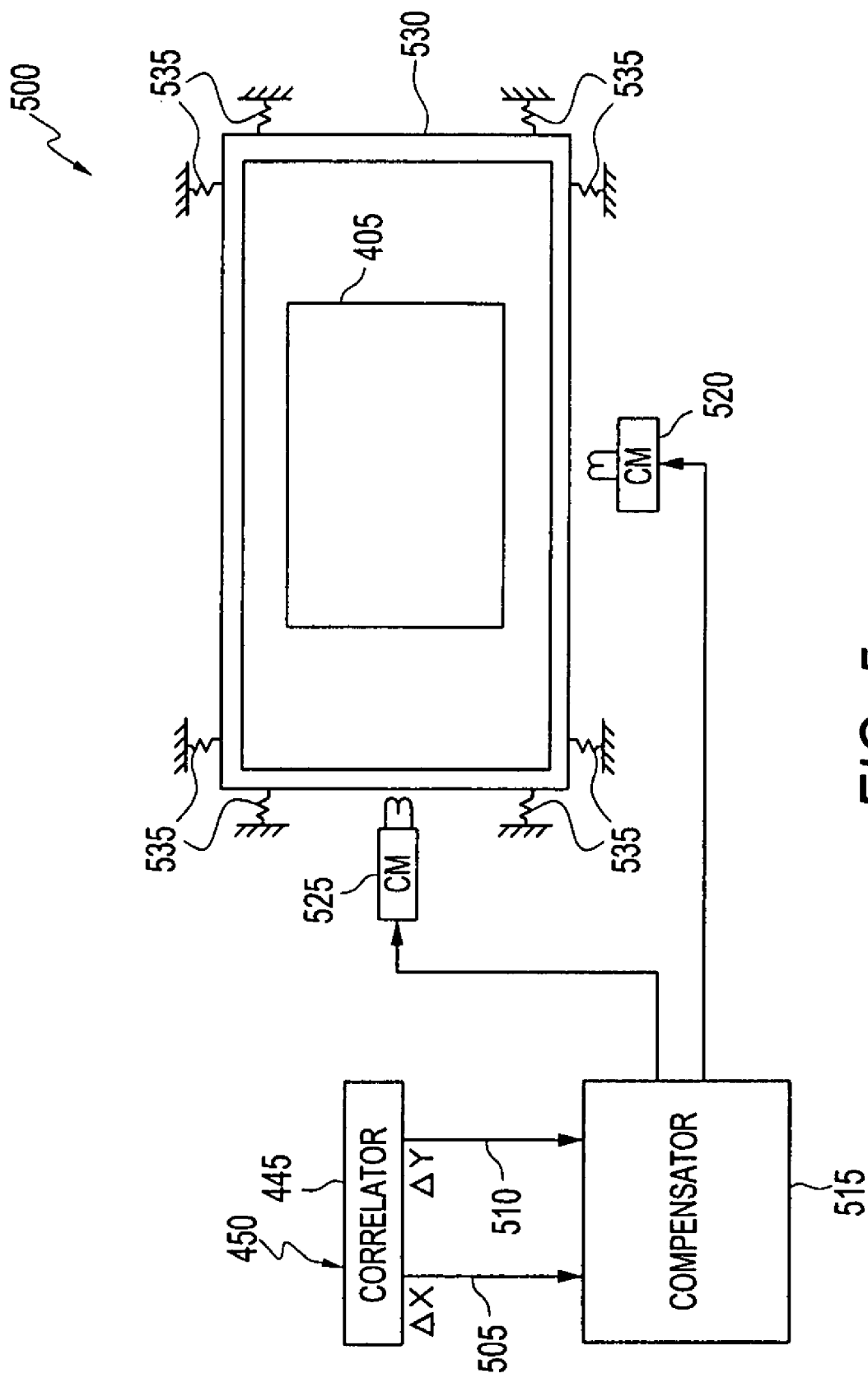
FIG. 5 is a block and schematic diagram illustrating a shifted-accumulation of partially exposed images to compensate for detected motion.

FIG. 5 depicts an example opto-mechanical method of image stabilization 500 using the displacement signal 450 provided by correlator 445. In this opto-mechanical approach, correlator 445 is electrically coupled to compensator 515, which is electrically connected to two coil motors (CM) 520 and 525. In this embodiment, coil motors 520 and 525 are configured such that they are capable of adjusting the position of a movable platform 530 which is movably connected to support beams 535. In this configuration, pixel array 405 is located on movable platform 530. In operation, once controller 440 provides displacement information from at least one of the second photo-conversion devices of the dual-mode pixels 300 of pixel array 405 to the correlator 445, correlator 445 determines the displacement signal 450. Correlator 445 may apportion the displacement signal 450 between an "x" component 505 and a "y" component 510. These x and y components may be sent to compensator 515, which is configured to use the received components of the displacement signal to opto-mechanically compensate for camera shake. Alternatively, correlator 445 may provide the displacement signal 450 to compensator 515, which apportions the signal between the x and y components or another coordinate system. In either case, compensator 515 uses the information received to adjust the position of movable platform 530, and thus of pixel array 405, to maintain a substantially fixed relationship between the light received from the desired image and the individual portions of the pixel array 405. While two coil motors, and eight support beams are depicted in FIG. 5, variations of these components may be used. Additionally compensation for image displacement may be performed in other coordinate systems other than an x, y, z coordinate system. In some current consumer devices a piezo-electric method of image stabilization is used.

Figure 6:
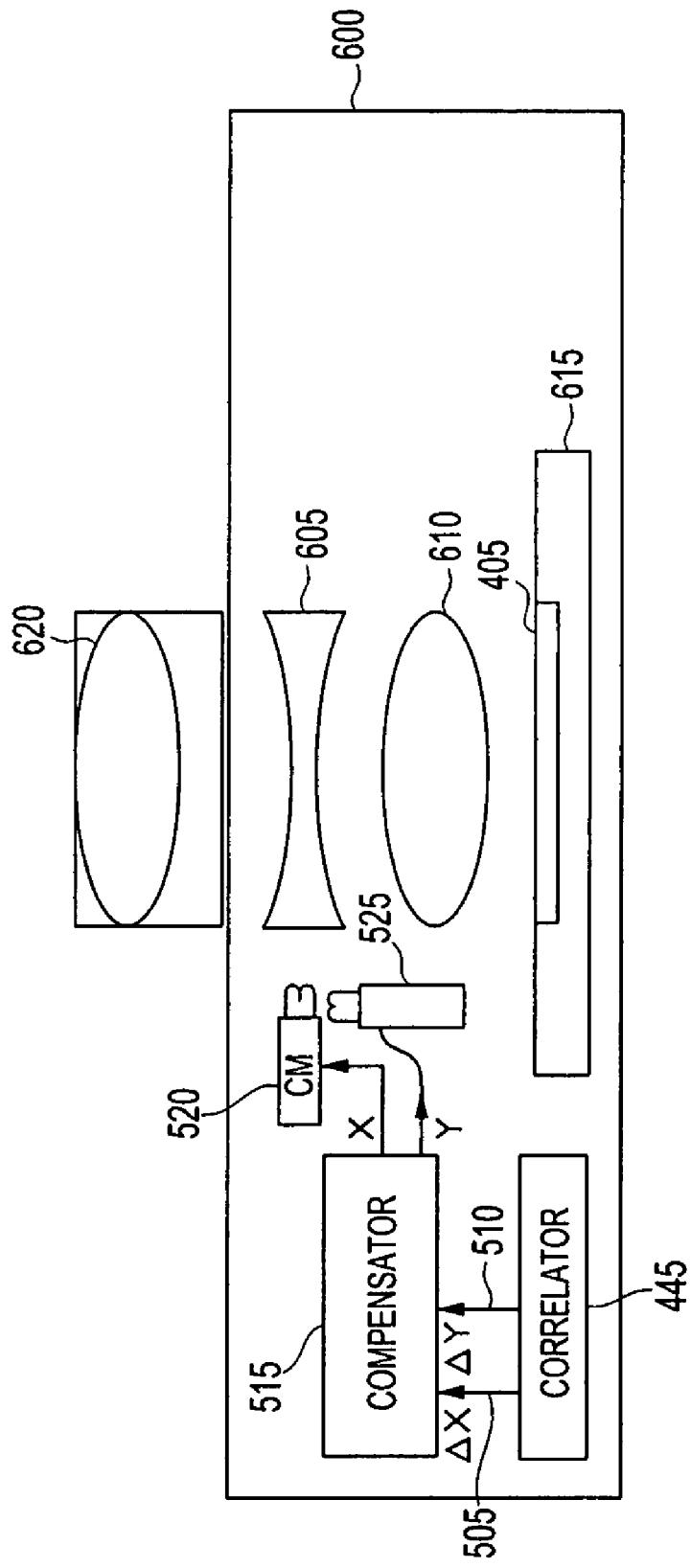
FIG. 6 is a block and schematic diagram illustrating a system for mechanically displacing a lens element to compensate for detected motion.

FIG. 6 shows an alternate opto-mechanical system to compensate for camera shake which uses mechanical displacement of a lens element instead of an array. In this embodiment, imaging device 600 includes a correlator 445, a compensator 515, an x-control module 520, a y-control module 525, a pair of compensation lenses 605 and 610, a stationary platform 615 on which pixel array 405 is attached, and an objective lens 620. In one embodiment, as illustrated, compensation lens 605 provides a moveable concave lens and compensation lens 610 comprises a fixed mounted convex lens element. Compensator 515 is electrically connected to x-control module 510 and a y-control module 525. In this embodiment, correlator 445 provides a displacement signal 450 or x-component 505 and y-component 510 of the displacement signal to compensator 515. The y-component 510 of displacement signal 450 would be used to drive the y-control module which would lie in a plane perpendicular to the x-component 505. Compensator 515 uses the received signal to determine how compensation lens 605 should be moved to compensate for camera shake. By controlling the movement of concave lens element 605 to counter the movement of imaging device 600, concave lens element 605 and fixed-mounted convex lens element 610 work together to translate the light received via objective lens 620 relative to pixel array 405 such that the image remains substantially stationary relative to pixel array 405.

The embodiments described herein are also compatible with other methods of compensating for camera shake such as iterative procedures for recovering latent images that have been blurred by a known point spread function known as deconvolution of the known point spread function. This deconvolution may be performed during post-processing. One example of correction mechanism is by use of the Richardson-Lucy algorithm to perform Richardson-Lucy deconvolution. Alternatively, the displacement signal 450 may be used with an expectation maximization framework to correct for the subpixel motion.

Figure 7:
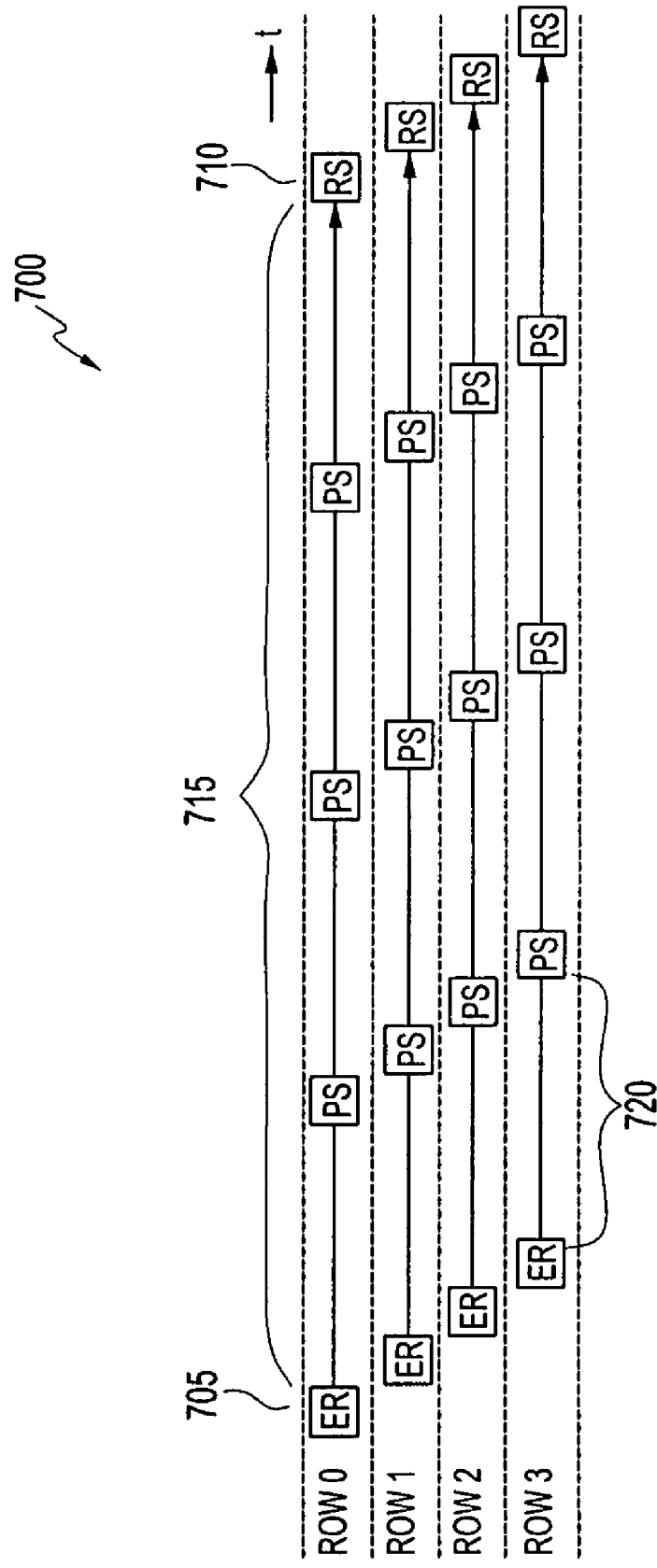
FIG. 7 illustrates one embodiment of a process employed by a single array image stabilizing system.

FIG. 7 is an array timing diagram 700 illustrating the relationship between the integration period of the first photo-conversion device ("the first integration period") 715 and the integration periods of the second photo-conversion device ("the second integration period") 720. With the addition of dual-mode pixels to the primary array 405 (FIG. 4) a row timing is required which allows the charge accumulated in the second photo-conversion device to be accessed and used for image stabilization. In a single mode pixel array, the row timing for a CMOS image sensor includes a rolling reset sequence called exposure reset (ER) 705 prior to the start of the first integration period followed by a rolling read sequence called row sample (RS) at the end of the first integration period. During the integration period light from the desired image is focused by a lens onto the pixel array resulting in charge accumulation on the first photo-conversion device. FIG. 7 shows four integration and samplings periods of the second photo-conversion device during a charge integration period of the first photo-conversion device of a dual mode pixel; however this is only illustrative as any number of integration and sampling periods for the second photo-conversion devices may be used, including the above described example of 10 such periods.

Figure 8A:
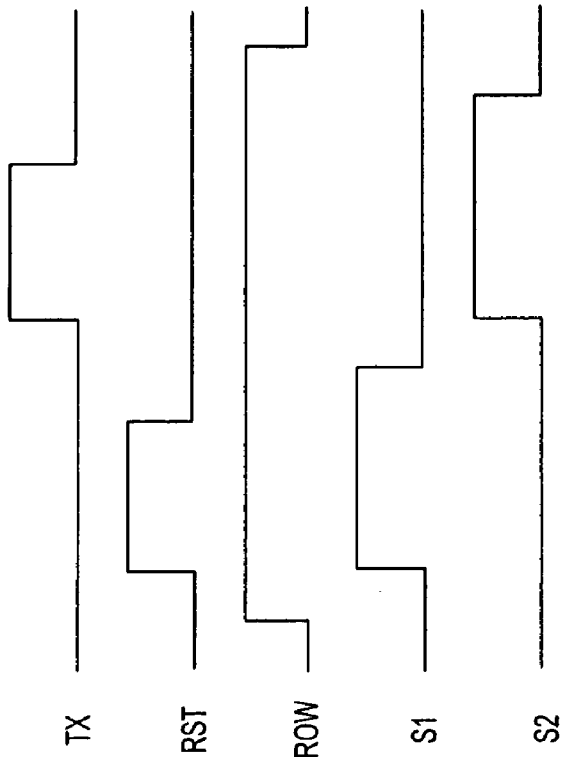
FIGS. 8A and 8B are example timing diagrams for the first integration period of a dual mode pixel according to an embodiment described herein.
Figure 8B:
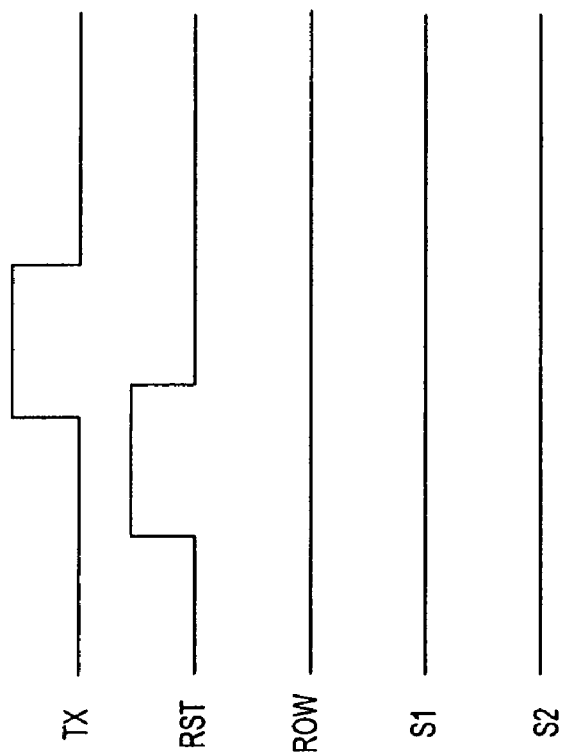

FIG. 8A is an exemplary timing diagram for ER at the beginning of the integration period 715 according to an embodiment described herein. The RST control signal is asserted to cause reset transistor 325 to conduct. Shortly thereafter, the TX control signal is asserted to cause transfer transistor 310 to conduct. This couples the first photodiode 305 to the pixel power potential $V_{AAPIX}$ and the voltage at the first photodiode 305 is reset to the pixel power potential $V_{AAPIX}$ less a voltage drop associated with reset transistor 325. The TX control signal is turned off to begin the integration of the normal pixel signal. FIG. 8B is an exemplary timing diagram for RS at the end of the integration period 715 of a first photo-conversion device of a dual mode pixel according to an embodiment described herein. The ROW control signal is asserted to cause the row select transistor 335 (FIG. 3A) to conduct. Shortly thereafter, the RST control signal is asserted to cause reset transistor 325 to conduct. This couples the floating diffusion region 315 to the pixel power potential $V_{AAPIX}$ and the voltage at the floating diffusion region 315 is reset to the pixel power potential $V_{AAPIX}$ less a voltage drop associated with reset transistor 325. In this configuration, columns "sample" the signal on the falling edge of S1/S2. Then TX control signal is asserted and $V_{sig}$ in response to control signal S2 of FIG. 8 is read at node 340. After $V_{sig}$ is read out for this specific row, the process repeats itself for another row of pixel array 405. FIG. 8 also represents an exemplary timing diagram for the integration period the photo-conversion device 105 of single mode pixels included in pixel array 405.

Referring back to FIG. 7, also illustrated is the timing for the acquisition of charge from the second photo-conversion device of the dual-mode pixel. Each of these samplings are referred to as poll samples (PS). In one embodiment, as illustrated in FIG. 7, four PS are taken during the first integration period 715 of the first photo-conversion device. These PS may be associated with a second integration period 720, as illustrated in FIG. 7, or they may be associated with some other criteria for reading the charge from the second photo-conversion device. For example, in one embodiment, the charge on the second photo-conversion device is read out as soon as enough charge has been accumulated to allow common features of the desired image to be distinguished.

Figure 9:
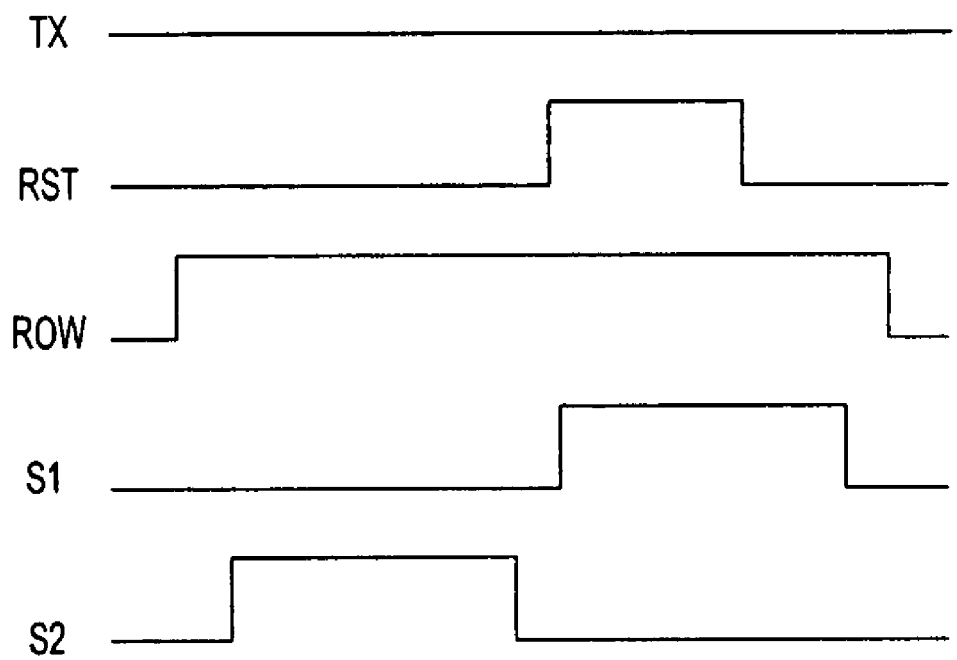
FIG. 9 is an example timing diagram for the second integration period of a dual mode pixel according to an embodiment describe herein.

FIG. 9 is an example timing diagram for the integration period of the second photo-conversion device of dual mode pixel 300. The ROW control signal is asserted to cause the row select transistor 335 (FIG. 3A) to conduct. During the period of time row select transistor 335 is conducting and neither reset transistor 325 nor transfer (TX) transistor 310 are conducting, a voltage for the poll sample $V_{ps}$ is set up when S2 is high and is read out on node 340 on the falling edge of S2, i.e., when the signal is high, by column circuits. Shortly thereafter, the RST control signal is asserted high to cause reset transistor 325 to conduct and while both row select transistor 335 and reset transistor 325 are conducting, the reset voltage for the poll sample $V_{psrst}$ is set up while S1 is high and is read out at node 340 on the falling edge of sampling signal S1, i.e., when the signal is high. As described, multiple pairs of $V_{ps}$ and $V_{psrst}$ values may be read out and sampled by the signals S2 and S1 during the first integration period. Further, as illustrated by FIG. 9, the TX control signal is not asserted when the charge on the second photo-conversion device is read out and sampled.

Figure 10:
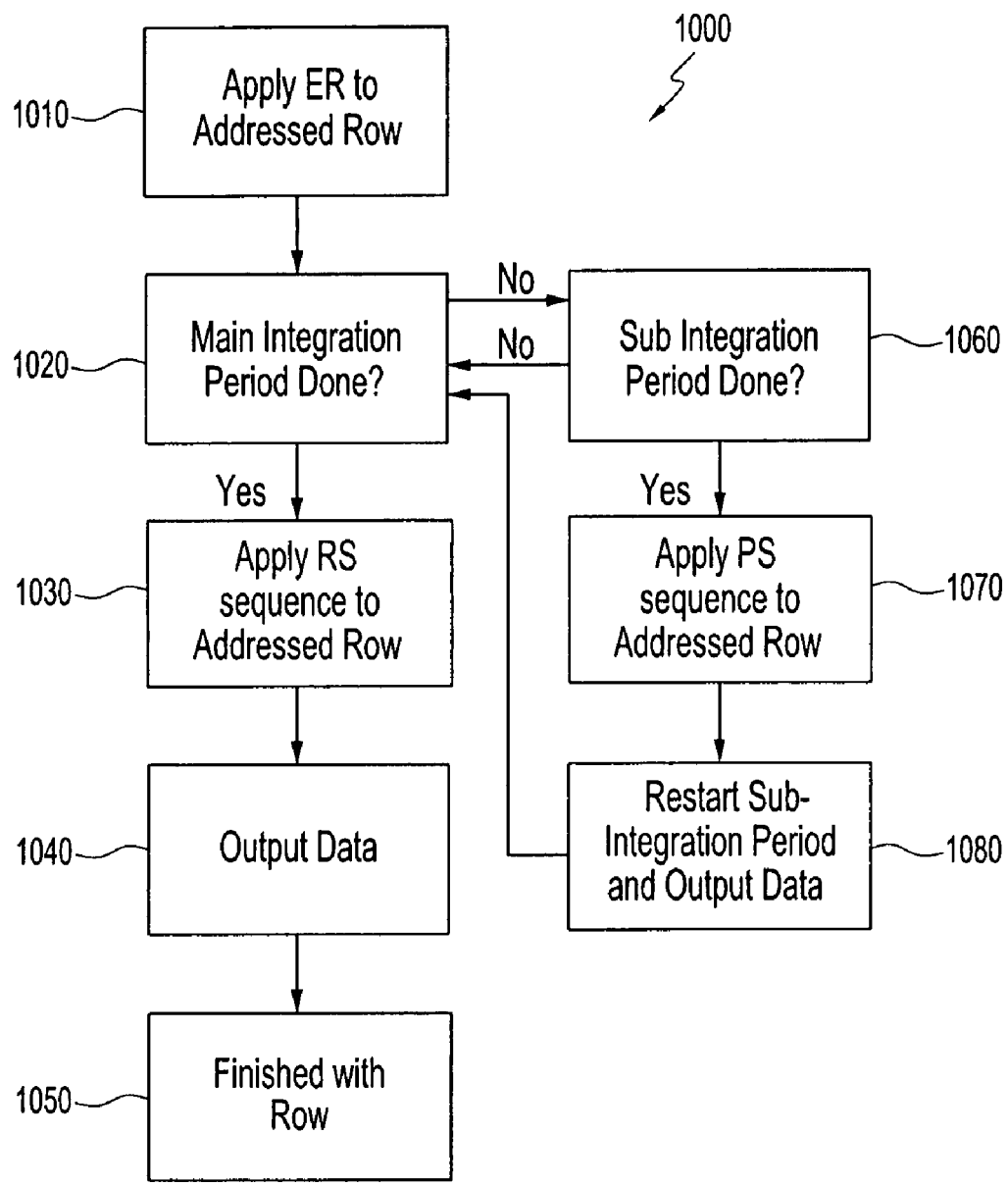
FIG. 10 illustrates one embodiment of an image stabilization process in accordance with an embodiment described herein.

FIG. 10 illustrates one embodiment of an image stabilization process 1000 in accordance with an embodiment. At step 1010 the rolling reset sequence ER 705 is initiated in an addressed row. As discussed above, in the ER 705 sequence, the first photodiode 305 is coupled to the pixel power potential $V_{AAPIX}$ and the voltage at the first photodiode 305 is reset to the pixel power potential $V_{AAPIX}$ less a voltage drop associated with reset transistor 325. The TX control signal is turned off to begin the integration of the normal pixel signal, i.e., the main integration period.

At step 1020, the if the main integration period is not done, the process proceeds to step 1060. At step 1060, if the sub-integration period is not done, the process returns to step 1020. The process continues in this manner until either the main integration period or the sub-integration period is done. If the sub-integration period is done, the process proceeds to step 1070 and the PS sequence is initiated to generate a voltage for the poll sample $V_{ps}$ and the reset voltage for the poll sample $V_{psrst}$ on node 340 as described above. The process proceeds to step 1080 where the values of $V_{ps}$ and $V_{psrst}$ are read out and the sub-integration period is restarted. The process then returns to step 1020. As described above, multiple pairs of $V_{ps}$ and $V_{psrst}$ values may be read out and sampled during the main integration period and therefore, the process may cycle through steps 1020, 1060, 1070, and 1080 a number of times.

When the main integration period is done, the process proceeds to step 1030 at which the RS is initiated. During RS, the floating diffusion region 315 is reset to the pixel power potential $V_{AAPIX}$ less a voltage drop associated with reset transistor 325 and, at step 1040, Vsig is read out for the addressed row. Finally, at step 1050, the process has ended for the addressed row and may repeat on the next row.

Figure 11B:
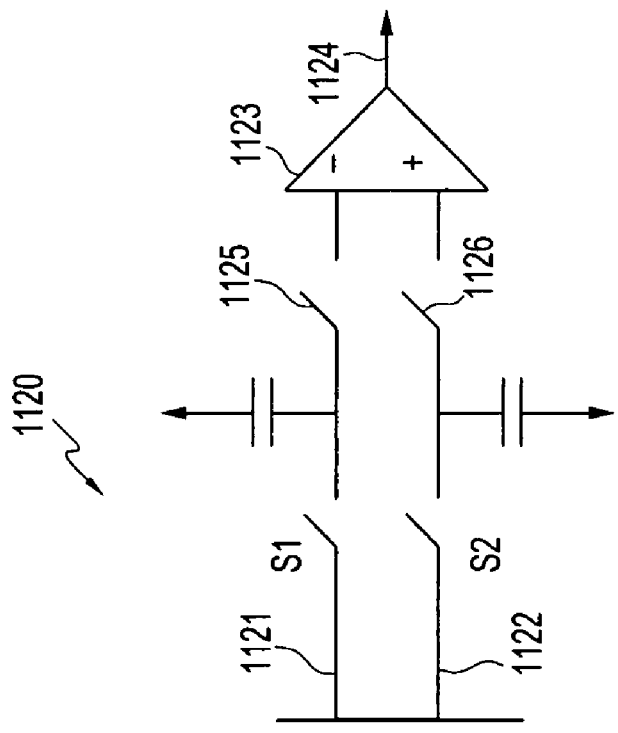
FIGS. 11A, 11B, and 11C illustrate circuits to be used with various embodiments to combine the reset and the signal to determine the charge on the photo-conversion device.
Figure 11A:
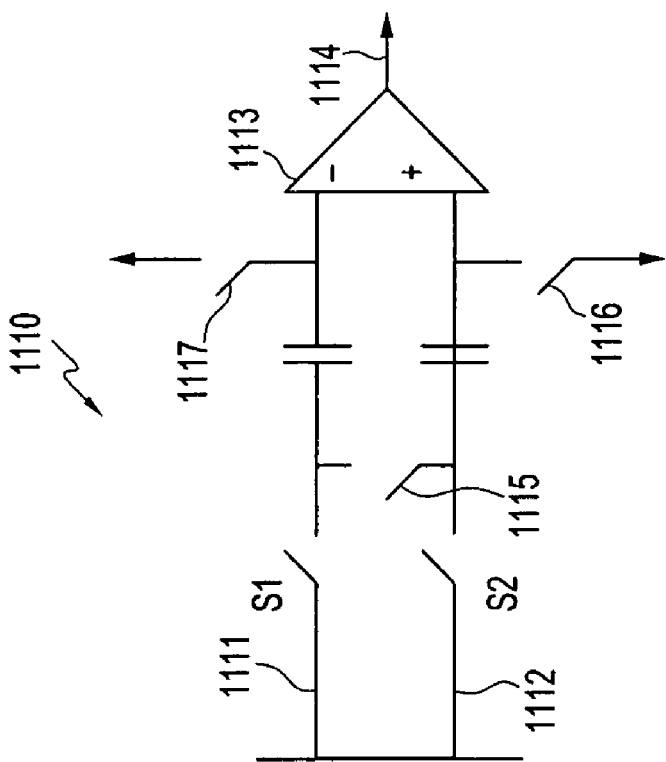
Figure 11C:
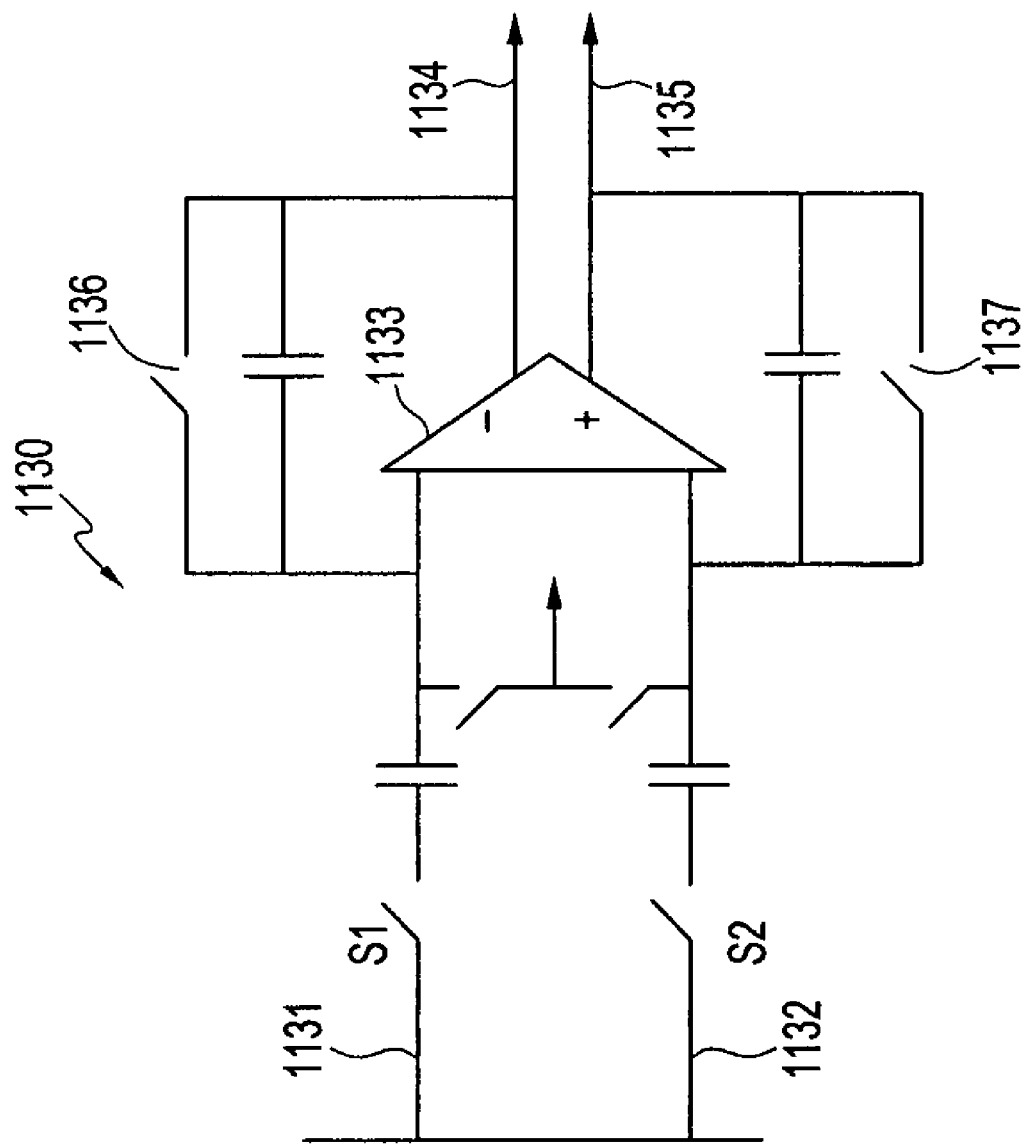

FIGS. 11A and 11B illustrate simplified sample and hold circuits and FIG. 11C illustrates a more complex, but more accurate sample and hold circuit. The sample and hold circuits 1110, 1120, 1130 are used to subtract the reset value and the signal value to determine the charge on the appropriate photo-conversion device. In one embodiment, the circuit 1110 of FIG. 11A is used to determine the charge on the first photo-conversion device. $V_{rst}$ is applied to input line 1111 and $V_{sig}$ is applied to input line 1112. The differential amplifier 1113 performs the $V_{rst}-V_{sig}$ (or $V_{sig}-V_{rst}$) subtraction to determine the $V_{pixel}$ value at 1114. Switches 1116, 1117 are closed during all of the RS and PS sequences. Switch 1115 closes during column readout as each column is addressed. When the circuit 1110 is used to determine the charge on the second photo-conversion device, $V_{psrst}$ is applied to input line 1111 and $V_{ps}$ is applied to input line 1112. In this configuration, $V_{poll}$ may be read at 1114.

In another embodiment, the circuit 1120 of FIG. 11B is used to determine the charge on the first photo-conversion device. $V_{rst}$ is applied to input line 1121 and $V_{sig}$ is applied to input line 1122. The differential amplifier 1123 performs the $V_{rst}-V_{sig}$ (or $V_{sig}-V_{rst}$) subtraction to determine the $V_{pixel}$ value at 1124. Switches 1125, 1126 are closed during the column readout. When the circuit 1120 is used to determine the charge on the second photo-conversion device, $V_{psrst}$ is applied to input line 1121 and $V_{ps}$ is applied to input line 1122. In this configuration, $V_{poll}$ may be read at 1124.

In another embodiment, the circuit 1130 of FIG. 11C is used to determine the charge on the first photo-conversion device. $V_{rst}$ is applied to input line 1131 and $V_{sig}$ is applied to input line 1132. The differential amplifier 1133 performs the $V_{rst}-V_{sig}$ (or $V_{sig}-V_{rst}$) subtraction to determine the $V_{pixel}$ value at 1134, 1135. Switches 1136, 1137 are closed when the circuit 1130 is not in column readout mode. When the circuit 1130 is used to determine the charge on the second photo-conversion device, $V_{psrst}$ is applied to input line 1131 and $V_{ps}$ is applied to input line 1132. In this configuration, $V_{poll}$ may be read at 1134. Preferably, the same sample and hold circuit 1110, 1120, or 1130 is used to determine $V_{pixel}$ as well as $V_{poll}$. The output of the FIG. 11A, 11B, or 11C sample and hold circuit is provided to an analog to digital converter and to controller 440 which provides the digitized $V_{poll}$ signal to correlator 445 which provides the displacement signal on line 450.

Motion of the imaging device during the first integration period causes common features in the image to appear in a different location in successive scenes. For example, movement of the imaging device down and to the left (relative to the user) causes the location of a common feature in a subsequent scene to be translated up and to the right with respect to the pixel array. Correlator 445 compares, or correlates, pairs of consecutive images in the plurality of images and determines movement of the imaging device during a portion of the first integration period based on the differences in pixel locations of common features in the image. Based on the comparison performed, correlator 445 generates a displacement signal 450 which, in this example, would include a first displacement component in the x direction and a second displacement component in the y direction. These displacement components would be indicative of incremental movement of the imaging devices in the x-direction and the y-direction. The displacement components are used by the CMs attached to the flexible stage or to the lens structure to move to compensate for the detected motion of the imaging device. In one embodiment vector analysis is used to determine the magnitude and direction of the motion of the imaging device during the first integration period. In one embodiment edge analysis is used to determine motion of the imaging devices by comparing the location of the edge in one image with the location of the same image in a successive image.

Figure 12:
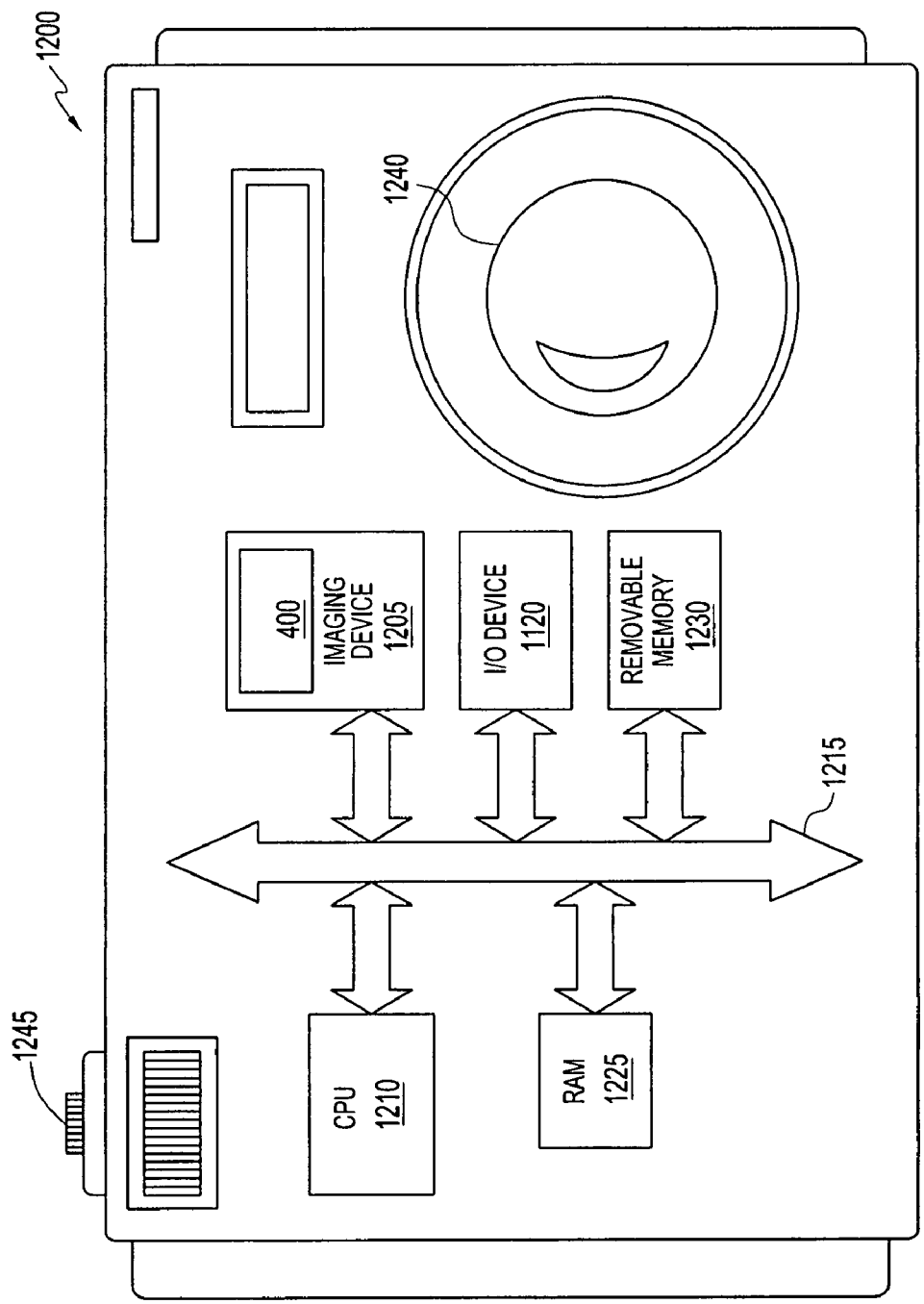
FIG. 12 is a block diagram of a processing system according to an embodiment described herein.

FIG. 12 illustrates an image processor system 1200, for example, a still or video digital camera system, which includes a CMOS image device 1205 including a single array image stabilization system 400 of FIG. 4. System 1200 includes a processor 1210 having a central processing unit (CPU) that communicates with various devices over a bus 1215. Some of the devices connected to the bus 1215 provide communication into and out of the system 1200, one or more input/output devices 1220 and image stabilization system 400. Images are input through a lens 1240 when a shutter release button 1245 is depressed. Other devices connected to the bus provide memory, illustratively including a random access memory RAM 1225, and one or more peripheral memory devices such as a removable memory 1230. The image single array image stabilization system 400 may be coupled to processor 1210 for image processing, or other image handling operations. Examples of other processor based systems describe a camera system, which may employ the image stabilization system 400, include, without limitation, computer systems, camera systems, scanners, machine vision systems, vehicle navigation systems, video telephones, surveillance systems, auto focus systems, star tracker systems, motion detection systems, image stabilization systems, and similar systems.

The embodiments described herein may also be applied to CMOS imagers in which the floating diffusion region is shared among a group of several nearby photodiodes. Additionally, in the implementation of the above embodiments, a tradeoff may be made between resolution and sensitivity. Navigational computations dependent on the charges received from the second photo-conversion devices located in the dual-mode pixels can be accurate enough using interpolation techniques when the resolution of the navigational sensor is approximately 16 times lower than that of the RGB subpixel pitch. Accordingly, it may be sufficient to combine the charge from the floating diffusion regions associated with a 16 by 16 array of photodiodes. This approach gives 16 to 64 times more signal than from the use of individual floating diffusion region readouts. This tradeoff may allow for sufficient angle measurements to occur during the shutter time of the main imaging device depending on the relative light sensitivity of the floating diffusion regions as compared to the sensitivity of the first photo-conversion devices in the dual-mode pixels. The embodiments disclosed may also be modified for the pixels and readout architectures of other solid state imagers such as CCD.

What is claimed as new and desired to be protected by Letters Patent of the United States is:

1. An imaging device comprising:
    a pixel array configured to receive an image, said array comprising a plurality of first pixels each having first and second photo-conversion devices, said first photo-conversion devices configured to acquire an image signal during a first integration period, said second photo-conversion devices configured to acquire a plurality of image signals during said first integration period;
    a circuit for using said plurality of image signals generated by said second photo-conversion devices and detecting therefrom relative motion of the imaging device and an image during a portion of said first integration period and providing a signal representing said motion, wherein the first and second photo-conversion devices of each of the first pixels are coupled to a common storage node in that first pixel.

2. The imaging device of claim 1, further comprising a plurality of second pixels, each having a first photo conversion device.

3. The imaging device of claim 2, wherein said plurality of first pixels are separated from one another by said second pixels.

4. The imaging device of claim 2, wherein said plurality of first pixels are located to form a plurality of vertical lines or a plurality of horizontal lines throughout said pixel array.

5. The imaging device of claim 2, wherein said plurality of first pixels are located to form a plurality of intersecting vertical and horizontal lines throughout said pixel array.

6. The imaging device of claim 1, further including a lens configured to provide said image to said pixel array.

7. The imaging device of claim 1, wherein said first and said second photo-conversion devices are readout using the same readout circuitry.

8. The imaging device of claim 1, further including a compensator configured to maintain a substantially fixed relationship between the image and the imaging device based on the signal representing said motion.

9. The imaging device of claim 8, wherein said compensator opto-mechanically maintains the substantially fixed relationship.

10. The imaging device of claim 9, wherein said pixel array is located on a movable platform and wherein said compensator provides signals to displace said platform to maintain the substantially fixed relationship.

11. The imaging device of claim 10, wherein said pixel array is located on a fixed platform and is associated with a moveable lens element and wherein said compensator provides signals to displace the lens element to maintain the substantially fixed relationship.

12. The imaging device of claim 1 wherein vectors are used to determine the relative motion during a portion of said first integration period.

13. The imaging device of claim 1 wherein edge analysis is used to determine said relative motion during a portion of said first integration period.

14. A digital camera comprising:
    a pixel array including a plurality of dual-mode image pixels, each dual-mode image pixel containing first and second photo-conversion devices, wherein—the first and second photo-conversion devices of each of the dual-mode image pixels are coupled to a common storage node in that dual-mode image pixel and wherein each of the first photo-conversion devices is coupled to its respective common storage node through a respective transfer transistor;
    a control circuit for operating said pixel array such that the first photo-conversion devices acquire an image during a first integration period and the second photo-conversion devices acquire a plurality of successive image signals during the first integration period;
    a circuit for acquiring said plurality of successive image signals and configured to:
        determine a location difference of at least one common feature between first and second image signals of said plurality of image signals, and
        provide a displacement signal indicative of relative motion between an image and said pixel array during a portion of said first integration period.

15. The digital camera of claim 14, further comprising a plurality of single-mode image pixels, each single-mode image pixel contains a first photo-conversion device, and wherein the dual-mode pixels are interspersed with the single-mode pixels in said array.

16. The digital camera of claim 14, wherein the plurality of images captured by the second photo-conversion devices during the first integration period is greater than three.

17. The digital camera of claim 14, further comprising a readout circuit for reading out signals from the first photo conversion devices and the second photo-conversion devices.

18. The digital camera of claim 14, further including a compensator configured to maintain a substantially fixed relationship between the image and the pixel array based on the displacement signal.

19. The digital camera of claim 14, wherein vectors are used to determine relative motion of the digital camera and an image during a portion of said first integration period.

20. The digital camera claim 14, wherein edge analysis is used to determine relative motion of the digital camera and an image during a portion of said first integration period.

21. A method of operating an imaging device comprising:
    inputting light from a desired image to a pixel array, the pixel array including a plurality of dual-mode pixels, each having first and second photo-conversion devices, wherein the first and second photo-conversion devices of each of the dual-mode pixels are coupled to a common storage node in that dual-mode pixel, receiving light on said first photo-conversion devices during a first integration period, receiving light on said second photo-conversion devices during the first integration period, reading a first charge from said second photo-conversion devices at a first time during said first integration period, reading a second charge from said second photo-conversion devices at a second time during said first integration period, using the first and second read charges to determine relative movement of the imaging device and an image during a portion of the first integration period, and compensating for the determined movement.

22. The method of claim 21, wherein the pixel array further includes a plurality of single-mode pixels, each having a first photo-conversion device.

23. The method of claim 21, further comprising:

reading a third charge from said second photo-conversion devices at a third time during said first integration period, using the second charge and third read charges to determine relative movement of the imaging device and an image during a portion of said first integration period, and compensating for the determined movement.

24. The method of claim 21, further comprising opto-mechanically performing said compensation, wherein said pixel array is located on a movable platform, and said act of compensating comprises:

maintaining a fixed relationship between said pixel array and said image by moving said movable platform to compensate for said determined movement.

25. The method of claim 21, further comprising opto-mechanically performing said compensation wherein said pixel array is located on a fixed platform, and said act of compensating comprises:

maintaining the fixed relationship between said pixel array and said image by moving and element of a lens which focuses an image on the pixel array.

* * * * *